TRANSDUCER

Filed Oct. 4, 1961 2 Sheets-Sheet 1

INVENTOR.
WALLACE W. KOSKIE
DONALD K. SAMPSON
BYRON D. SMITH
BY Carlsen & Carlsen
ATTORNEYS Feb. 16, 1965 W. W. KOSKIE ETAL 3,170,149

TRANSDUCER

Filed Oct. 4, 1961 2 Sheets-Sheet 2

INVENTOR.
WALLACE W. KOSKIE
DONALD K. SAMPSON
BYRON D. SMITH

BY Carlsen & Carlsen

ATTORNEYS

United States Patent Office 3,170,149
Patented Feb. 16, 1965

3,170,149
TRANSDUCER

Wallace W. Koskie, Minneapolis, Donald K. Sampson, St. Paul, and Byron D. Smith, Minneapolis, Minn., assignors, by mesne assignments, to Data Products Corporation, Culver City, Calif., a corporation of Delaware Filed Oct. 4, 1961, Ser. No. 142,793
6 Claims. (Cl. 340—174.1)

This invention relates generally to the field of transducers and is more particularly directed to the field relating to the dynamic exchange of information between storage medium and output utilization equipment.

An example of an application for which this invention is useful is in the computer field in which coded information may be utilized in working with computations requiring the temporary or permanent storage of such information. One useful apparatus may be generally described as a disc file in which a plurality of rotating disc are utilized for the storage of information which may be magnetically recorded thereon. In order to satisfactorily accomplish the recording, and of course, reading of information off of the rotating members, suitable transducing devices must be utilized in which not only are the magnetic and electrical properties important, but because of the necessary requirements for reliability and life, certain mechanical aspects are of equal or greater importance. Some of these may relate to electrical functions and others are independent thereof.

Apparatus utilizing the disc for storage has, in the past, been substantially unsuccessful in commercial application. The prior art apparatus has utilized a transducer which may be mounted in proximity to a disc upon which information is to be recorded and read and moved radially of the disc to any one of a number of predetermined "tracks" thereon. Consistent with good engineering practice and to obtain reliable results, it has been found desirable to place the transducers in fairly close proximity to the rotating disc. This requirement gave rise to the introduction of what is known in the art as a flying head transducer or, more particularly, transducer mounting. In this type of apparatus, a mounting pad, or "wing" containing various transducers mounted upon its lower surface with respect to the disc with which it is to cooperate, is placed in close proximity to a rotating disc and a thin film of air, known as the boundary layer, is caused to flow therebetween due to the relative motion between the two devices. There being substantially no allowance for movement of the portion of the transducer device in proximity to the rotating disc, the requirement for flatness of the disc, or lack of surface variation, was reduced to a value which was difficult indeed to obtain both with respect to the disc itself and with respect to the coating of magnetizable material positioned thereon to provide the storage medium. Furthermore, virtual destruction of the recording medium on the surface of the disc was noted when various malfunctions occurred in the apparatus, which destruction could have been prevented were there means provided for removing the transducing device from proximity with the disc.

In our invention a new and useful improvement in transducer devices is provided in which relatively large variations in surface configuration of the disc and the recording medium may be easily tolerated while maintaining a relatively close proximity between the transducer and the disc. This is provided by means of a unique mounting arrangement which restricts allowable motion of the transducer carrying element, or mounting, both in the rotational sense and in the linear motion sense to movement which allows free compliance of the transducer with the surface of the disc while providing a useful fail safe operation and maintaining orientation of the transducing element so that the accuracy requirements for repeatability in moving and repositioning the transducer device from one track to another are met without any appreciable error.

It is an object of the present invention to provide a new and improved transducer device for use in apparatus wherein information interchange is desired between input and output utilization devices and a storage medium.

It is still a further object of this invention to provide an improved mounting arrangement for a transducer mounting, or carrier, which provides for desirable constrained motion thereof while allowing improved operation.

It is still a further object of this invention to provide transducer apparatus in which fail safe operation is assured.

Another object of this invention is to provide, in a flying head type of transducer, an improvement which provides for increased lateral stability while reducing the distance between the transducer mounting and the storage medium so as to provide increased transducing efficiency and tolerance for surface variations in the storage medium.

A further object of the present invention is to provide transducer apparatus in which the fluid medium utilized in operation of the device is further used for lubrication purposes.

These and other more detailed and specific objects will be disclosed in the course of the following specification, reference being had to the accompanying drawings, in which—

Figures 1, 2, 3:
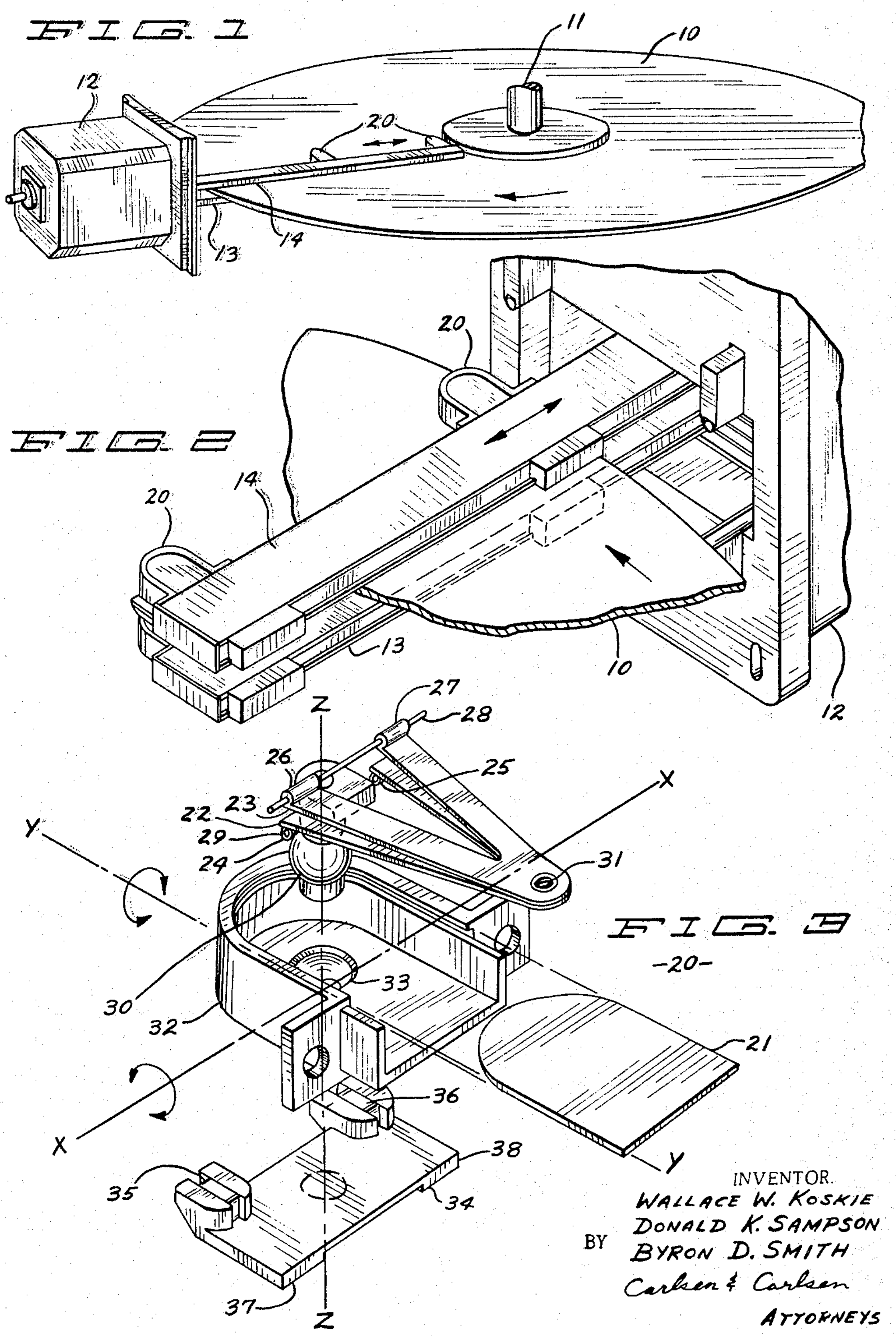
FIG. 1 is a pictorial representation of the environment of a system in which the apparatus of the present invention may be utilized.
FIG. 2 is an enlarged view of the same apparatus.
FIG. 3 is an exploded assembly diagram of the transducer device of our invention.

Referring now to FIGS. 1 and 2, a rotating disc member 10 which may be comprised of an aluminum disc coated with suitable storage medium responsive to electrical signals to provide a magnetic record, is mounted for constant angular rotation about a shaft 11. Shaft 11 may be driven from a constant speed source of power, such as a hysteresis synchronous motor of well known design (not shown). A plurality of transducer devices indicated generally by the reference character 20, are shown attached and positioned at intervals along a pair of radially movable mounting arms 13 and 14 which are in turn connected to the output of a linear positioner device 12. The arms 13 and 14 are hollow and contain the electrical connections to the transducer assemblies 20 and also connected to a source of fluid under presure (not shown). It may be seen that the transducer devices 20 may be positioned at any one of a plurality of "tracks" existing at predetermined locations on either the top or bottom surface of the disc member 10. Relative movement between disc member 10 and transducer devices 20 provide what is known as a boundary layer of air between the bottom surface of the transducer mounting member of each of the transducer devices 20 when air, or fluid under pressure, is applied to the interiors of the trasducer devices 20 through the mounting arms 13 and 14.

Referring specifically to FIGS. 3, 4, 5 and 6 in which like reference characters have been applied to like elements, a hollow frame member 32 includes a removable cover plate 21 and has a circular opening, or orifice 33 positioned at the lower extremity with an axis thereof substantially coaxial with the vertical axis of the frame indicated by the reference letters Z—Z. A further orifice, or opening, adapted for connection to the source of fluid, or air, under pressure is provided at the rear of the frame member.

A transducer mounting member or "wing" element 34 contains a projection 30 (normally rigidly attached thereto) which extends upwardly into the interior of the hollow frame member 32 and is of size and shape such that an uni-directional freedom of motion, within certain limits, is allowed. The diameter of member 30 is substantially the same as the diameter of opening 33 so as to provide for freedom of motion and for flow of some of the fluid under pressure therebetween to provide adequate and desirable lubrication thereof. Member 34 is adapted for operation in close proximity to the surface of the storage medium and contains a central longitudinally relieved portion and a pair of vertical downwardly extending end portions 37 and 38 which are, in essence, air borne by the boundary layer of air existing between the disc member 10 and the transducer mounting member 34 when relative motion exists between the storage medium and the transducer device. The rear portion of the transducer mounting member 34 extends diagonally upwardly and positioned at either end thereof are projections 35 and 36 shaped to receive suitable transducer devices which may be, for instance, read, write and erase coils having gaps positioned in the lower surface of member 34. It is desirable, since the trailing edge of the member 34, with respect to the direction of motion, is the most stable portion, the read, write transducers are mounted in this position and erase coils may be mounted forwardly thereof.

In FIG. 3, three mutually perpendicular axes are indicated by the reference characters Y—Y, X—X and Z—Z. It is understood that these are utilized for reference purposes only in the configuration shown and described in the drawings and would not necessarily be the same for certain operational attitudes. Here, for instance, the Z—Z axis is the vertical axis. The arrows applied to the Y—Y and X—X axes indicate that the transducer mounting member 34 may be rotated about these axes and it should also be apparent from the drawings that linear motion along the Z—Z axis is also possible. Conversely, linear motion along the Y—Y and X—X axes are constrained as is rotational motion about the Z—Z axis. The restriction of possible motion of transducer of mounting member 34 is obtained by suitable spring biasing or motion restraining members. In the described embodiment, a pair of bifurcated members 22 and 23, which may be formed of a resilient material such as phosphor bronze, are provided with a connecting means 31 at one extremity thereof that is positioned substantially near said extremity and holds the spring members in engagement while allowing rotational movement about the longitudinal axis of the member 31 of one spring member with respect to the other. At the opposite extremities, the spring members 22 and 23 are provided with coaxial tubular extensions 24, 25, 26 and 27 respectively. The forward extremity of member 22 is shown with projections 24 and 25 mounted upon a pin like member 29 which extends through the upper portion of projection 30 on member 34. Likewise, the projections 26 and 27 on member 23 are mounted upon a further pin member 28 which is substantially parallel to pin member 29 and extends into the sides of frame member 32.

Figures 4, 5:
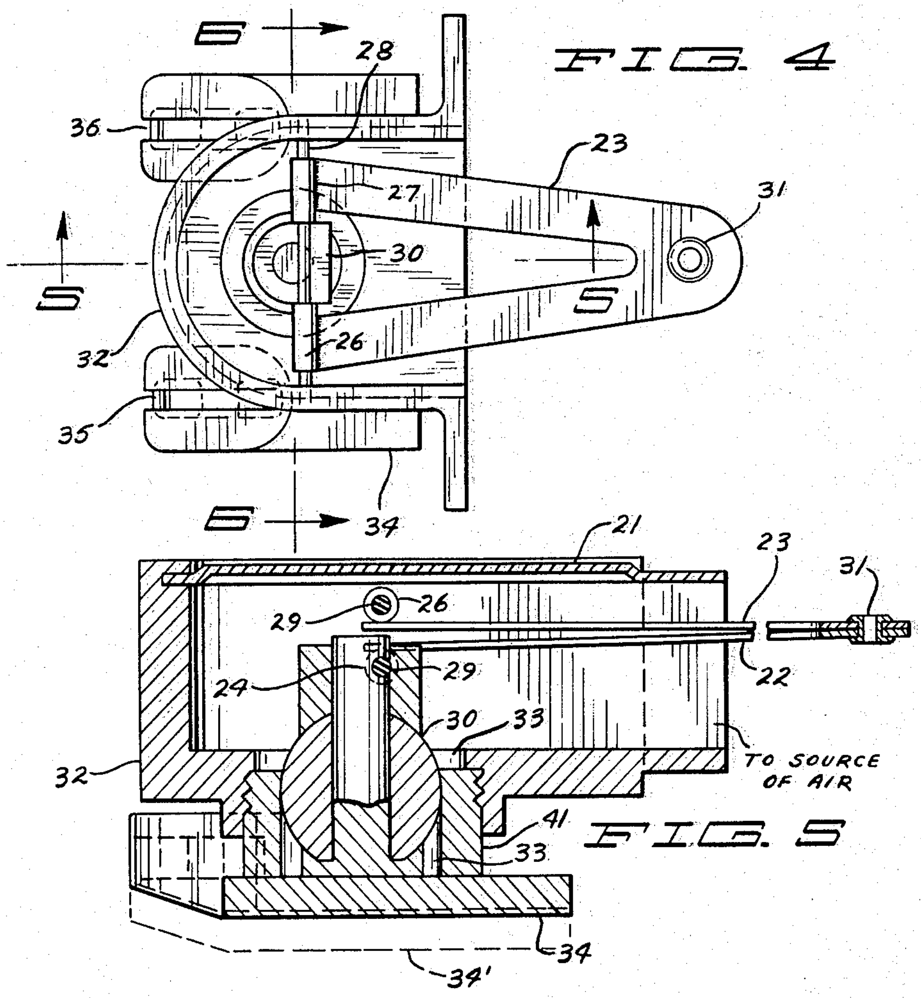
FIG. 4 is a top view of the apparatus shown in FIG. 3.
FIG. 5 is a sectional view taken along the section line 5—5 of FIG. 4.
Figure 6:
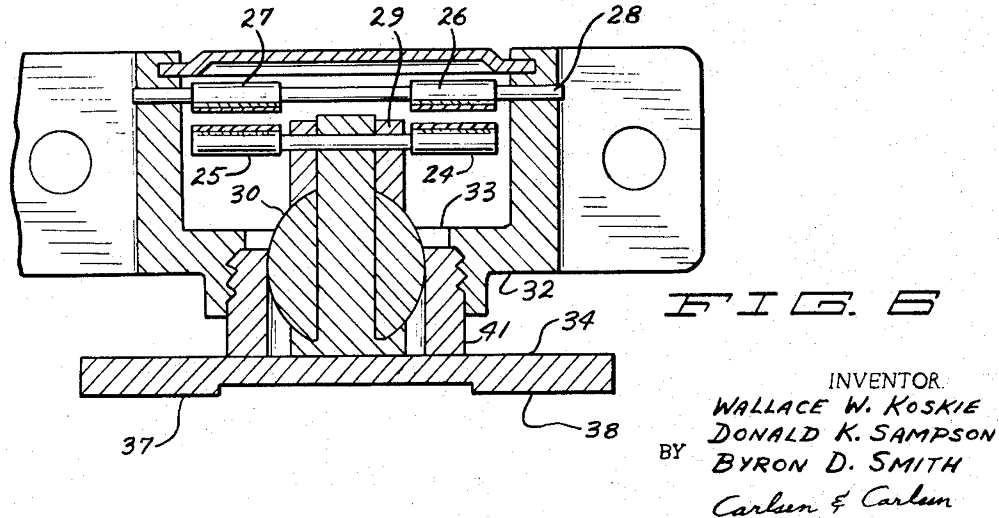
FIG. 6 is a sectional view of the apparatus of FIG. 3 taken along the section line 6—6 of FIG. 4.

The drawing depict the apparatus and device of our invention in inoperative state in which the member 34 is in its retracted position, that of non-engagement with the surface of the storage medium. FIG. 5 illustrates, in dotted outline, the position 34' of the member 34 when fluid, or air under pressure has been supplied to the interior of frame member 32. It is to be noted that the position of member 31, which serves to join the bifurcated resilient members 22 and 23, is such that a force exists which tends to maintain projection 30 in the retracted position in which member 34 is resting upon the member 41. Member 41 is a lining member for opening 33 and may be constructed of a suitable wear resistant material. Likewise, the spherical surface upon projection 30 may also be of suitable wear resistant material. Upon energization of the transducer assembly, air under pressure serves to overcome the biasing force in the upward direction tending to retract the member 34 and it is urged into proximity with the storage member 10 where the force exerted in an upward direction by the boundary layer between the disc and member 34 and that of the source of air, or fluid under pressure is balanced and the member 34 remains separated from the disc by a distance dependent upon the relative magnitudes of the forces. A desirable distance would be in the magnitude of $\frac{1}{1000}$ of an inch.

It is noted that the largest force which may be applied to member 34 due to irregularities in the surface of the storage medium will lie along the Z—Z axis. By utilizing air under pressure for maintaining operating engagement of member 34 with storage medium 10, the highly advantageous operational characteristics is attained in which the downward bias, or force, applied to projection 30 and therefore to member 34 is accomplished, through what amounts to a spring having a zero rate. In other words, movement up or down of member 34 may be easily and rapidly accommodated.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. Transducer mounting apparatus comprising, a hollow frame member having mutually perpendicular first, second and third axes, an opening adapted for connection to a source of fluid under pressure and a circular opening having an axis coincident with said first axis, a first member located externally of said housing and being adapted to receive and hold a plurality of transducers, said member having a projection slidably inserted into said circular opening, having substantially the same size as said circular opening, being shaped to permit omni-directional motion of said member with respect to said frame; a pair of bifurcated members positioned inside said frame and adapted for connection at one extremity and having lateral tubular extensions formed at the opposite extremities thereof; connecting means interconnecting said last named members substantially at said one extremity so as to permit relative rotation therebetween; means rotatably connecting one of said other extremities to said frame along an axis parallel to said second axis and further means rotatably connecting the other of said extremities to the projection on said first member along an axis parallel to said second axis whereby said members cooperate to tend to maintain said first member in a retracted position adjacent said frame and to allow linear motion of said first member along said first axis and rotational movement of said first member about said second and third axes.

2. Transducer mounting apparatus comprising; a hollow frame having mutually perpendicular lateral, longitudinal and vertical axes, an opening adapted for connection to a source of fluid under pressure and a circular opening having an axis coincident with said vertical axis, a first member located externally of said housing and being for holding a plurality of transducers, said member having a projection slidably inserted into said circular opening; a portion of said projection being of substantially the same size as said circular opening and shaped to permit omni-directional motion of said member with respect to said frame and to provide a bearing surface for lubrication by said source of fluid; a pair of bifurcated resilient members positioned inside said frame and adapted for connection at one extremity and having co-axial tubular extensions formed at the opposite extremities thereof; connecting means interconnecting said last named members substantially at said one extremity to provide engagement therebetween and to permit relative rotation therebetween; means rotatably connecting one of said other extremities to said frame along an axis parallel to said lateral axis; further means rotatably connecting the other of said extremities to the projection on said first member parallel to said lateral axis whereby said resilient members cooperate to tend to maintain said first member in a retracted position adjacent said frame and permit linear motion along said vertical axis and rotational motion about said longitudinal and lateral axes.

3. Transducer mounting apparatus comprising; a hollow frame member having mutually perpendicular lateral, longitudinal and vertical axes, an opening adapted for connection to a source of fluid under pressure and a circular opening having an axis coincident with said vertical axis; a first member located externally of said hollow frame member and being adapted for holding a plurality of transducers, said member including a projection having a portion thereof extending slidably into said circular opening, said portion being of substantially the same size as said circular opening and spherical shape; a pair of V shaped resilient members positioned inside said frame adapted for connection at one extremity and having co-axial tubular extensions formed at the opposite extremities thereof; connecting means connecting said last named members into engagement substantially at said one extremity so as to permit relative rotation therebetween; means rotatably connecting the extremity on one of said members and to said frame along an axis parallel to said lateral axis; and further means rotatably connecting the other extremity on the other of said members to the projection on said first member along an axis parallel to said lateral axis.

4. Apparatus for supporting transducer means to be movable between a first information changing position adjacent a moving storage surface and a second inoperative position, said apparatus comprising a hollow housing having a first and a second opening therein, a transducer means support member, said member having an aerodynamic surface and having a projection extending into said first opening of said housing, spring means in said housing attached to said projection for yieldably biasing said member along a first axis toward said housing to a location at which said transducer means are in their first position without restricting rotational movement of said member about two axis which are mutually perpendicular to said first axis, said spring means comprising a pair of V-shaped spring members, means attaching said pair of V-shaped spring members to each other at the apex of said V to be rotatable about an axis perpendicular to the joined apices, means attaching the ends of one of said V-shaped spring members opposite to its apex to said housing, and means attaching the ends of the other of said V-shaped spring members opposite its apex to said projection and means for applying pnuematic pressure to said second opening for moving said second member along said one axis until said transducer means are in their first position.

5. Apparatus as recited in claim 4 wherein the ends of each of said V-shaped spring members opposite their apices are rolled into tubes, said means attaching the ends of said one of said V-shaped spring members to said housing includes a first pin passing through the tubes into the walls of said housing, and said means attaching the ends of the other of said V-shaped spring members to said projection includes an opening in said projection, and a second pin passing through said opening and through the tubes in the ends of said other V-shaped spring member.

6. Transducer apparatus comprising a hollow frame member including an input orifice, means for applying fluid under pressure to said input orifice, an output orifice in said hollow frame member, a transducer support member located externally of said hollow frame member, a projection on said support member extending within said output orifice to be acted upon by said fluid under pressure, spring means comprising a first and second bifurcated member, means coupling said first bifurcated member to said hollow frame member, and means coupling said second bifurcated member to said projection within said housing for permitting said transducer support member to be rotatable about two of its three mutually perpendicular axis and to bias said transducer support member in a direction which is opposite to that to which said transducer support member is urged by said fluid pressure.

References Cited in the file of this patent

UNITED STATES PATENTS

| | | |
|---|---|---|
| 2,886,651 | Vogel | May 12, 1959 |
| 2,969,435 | Lynott | Jan. 21, 1961 |

FOREIGN PATENTS

| | | |
|---|---|---|
| 210,582 | Australia | Oct. 2, 1957 |